US006941106B1

(12) United States Patent
Chen

(10) Patent No.: US 6,941,106 B1
(45) Date of Patent: Sep. 6, 2005

(54) STRUCTURE FOR REDUCING INTERMODULATION INTERFERENCE IN SATELLITE SIGNAL TRANSMISSION

(75) Inventor: Mao-Jen Chen, Taoyuan (TW)

(73) Assignee: Prime Electronics & Statellitcs, Inc., Taoyuan (TW)

( * ) Notice: Subject to any disclaimer, the term of this patent is extended or adjusted under 35 U.S.C. 154(b) by 459 days.

(21) Appl. No.: 10/281,304

(22) Filed: Oct. 28, 2002

(51) Int. Cl.[7] ........................... H04B 1/10; H04B 15/10
(52) U.S. Cl. ..................... 455/3.02; 455/295; 455/296; 455/303; 375/348
(58) Field of Search .............................. 455/3.02, 63.1, 455/67.13, 295, 296, 283, 552.1, 303, 317; 375/346, 348

(56) References Cited

U.S. PATENT DOCUMENTS 5,959,592 A * 9/1999 Petruzzelli ................... 725/68
6,424,817 B1 * 7/2002 Hadden et al. ............ 455/3.02
6,526,278 B1 * 2/2003 Hanson et al. .............. 455/427
2003/0083034 A1 * 5/2003 Motoyama .................. 455/323

* cited by examiner

*Primary Examiner*—Simon Nguyen
(74) *Attorney, Agent, or Firm*—Troxell Law Office PLLC

(57) ABSTRACT

A structure for reducing intermodulation interference in satellite signal transmission includes receiving antennas for receiving satellite polarized signals, an RF amplifying system for amplifying and down-converting the received signals, first and second mixers and a first-stage common local oscillator for executing a frequency subtraction, mid-frequency amplifiers and low-pass filters for amplifying and filtering signals output from the first and second mixers to generate a mid-band, a third mixer and a second-stage local oscillator for executing a frequency addition, a band-pass filter for filtering and isolating the resultant signal, and a fourth mixer and a third-stage local oscillator for executing another frequency subtraction, a high-pass filter for filtering the resultant signal to generate another non-repeated optimal mid-band, and a multiplex adder for combining the two mid-bands. Second and third harmonic differences between the second-stage and third-stage local oscillators do not fall in the two mid-bands to avoid intermodulation interference.

3 Claims, 5 Drawing Sheets

STRUCTURE FOR REDUCING INTERMODULATION INTERFERENCE IN SATELLITE SIGNAL TRANSMISSION

FIELD OF THE INVENTION

The present invention relates to a structure for reducing intermodulation interference in satellite signal transmission, in which a frequency of a signal having fixed bandwidth is subtracted from an oscillating frequency of a first-stage common local oscillator to generate a mid-band; and a frequency of the generated mid-band is added to an oscillating frequency of a second-stage local oscillator, and then subtracted from an oscillating frequency of a third-stage local oscillator to generate another mid-band. Second and third harmonic differences between the second-stage and third-stage local oscillators do not fall in the two mid-bands, so that an intermodulation interference is avoided.

BACKGROUND OF THE INVENTION

FIG. 1 shows the structure of a conventional satellite signal transmission apparatus. As shown, the apparatus includes two receiving antennas 1' for receiving vertical and horizontal polarized signals sent from a satellite. The received vertical and horizontal signals are respectively amplified and down-converted at amplifiers 11' and 12' that together form an RF amplifying system A. The amplified and down-converted signals are then separately sent to two band-pass filters 13' for filtering, so as to generate signals with fixed bandwidth. The filtered signals are then separately sent to mixers 2*a*' and 2*b*'.

The mixers 2*a*' and 2*b*' for the vertical and horizontal signals, respectively, receive oscillating frequencies of two different local oscillators 3' and 4', and separately mix the received oscillating frequencies with the above-mentioned signals having fixed bandwidth to generate two different mid-bands, which are filtered at a low-pass filter 5' and a high-pass filter 6', respectively, to remove noises therefrom.

The filtered signals are then sent to a multiplex adder 7' to execute an addition operation. The resultant signals are then transmitted via a cable 8'.

In the above-described structure, the oscillating frequencies of the two local oscillators 3', 4' isolate the vertical and the horizontal signal from each other to generate two non-repeated mid-bands. However, an intermodulation interference would occur if the oscillating frequencies were not properly selected.

To enable better understanding of many drawbacks of the conventional satellite signal transmission apparatus of FIG. 1, an example thereof is now described in more details. Please refer to FIG. 1. A vertical receiving antenna 1' receives a satellite vertical polarized signal having a frequency within the range from 3.7 to 4.2 GHz, and another horizontal receiving antenna 1' receives a satellite horizontal polarized signal also having a frequency within the range from 3.7 to 4.2 GHz. The received vertical and horizontal signals are amplified and down-converted at the RF amplifying system A and then separately sent to the band-pass filters 13' to generate two signals with fixed bandwidth, which are then sent to the mixers 2*a* and 2*b*, respectively. The vertical local oscillator 3' has an oscillating frequency of 5.15 GHz, and the horizontal local oscillator 4' has an oscillating frequency of 5.75 GHz. The oscillating frequencies of the two local oscillators 3' and 4' are output to the mixers 2*a*' and 2*b*', respectively, to mix with the frequencies from 3.7 to 4.2 GHz of the vertical and the horizontal signals with fixed bandwidth. A frequency subtraction operation is executed at the mixers 2*a*', 2*b*' to obtain a maximum vertical frequency of 1450 MHz (i.e., 5.15–3.7 GHz=1450 MHz) and a minimum vertical frequency of 950 MHz (i.e., 5.15–4.2 GHz=950 MHz), so as to generate the mid-band as shown in FIG. 2A. Meanwhile, a maximum horizontal frequency of 2050 MHz (i.e., 5.75–3.7 GHz=2050 MHz) and a minimum horizontal frequency of 1550 MHz (i.e., 5.75–4.2 GHz=1550 MHz) are similarly obtained to generate the other mid-band as shown in FIG. 2B. The resultant mid-bands are filtered at the low-pass and the high-pass filter 5' and 6', respectively, to remove noises therefrom. The filtered mid-bands are then sent to the multiplex adder 7' to execute the addition operation to generate the combined vertical and horizontal mid-bands, as shown in FIG. 2C.

A second harmonic difference between the oscillating frequencies of the vertical and the horizontal local oscillator 3', 4' is (2×5.75)GHz–(2×5.15)GHz=1200 MHz and a third harmonic difference between the oscillating frequencies of the vertical and the horizontal local oscillator 3', 4' is (3×5.75)GHz–(3×5.15)GHz=1800 MHz. The above two harmonic differences of 1200 MHz and 1800 MHz fall in band ranges from 950 to 1450 MHz and from 1500 to 2050 MHz, respectively, as shown in FIG. 2D, and therefore result in the intermodulation interference and the problem of failed reception of video signals.

SUMMARY OF THE INVENTION

It is therefore a primary object of the present invention to provide a structure for reducing intermodulation interference in satellite signal transmission. The structure includes a first-stage common local oscillator for executing a frequency subtraction operation to generate a mid-band, and a second-stage local oscillator for executing a frequency addition operation to add the frequency of the generated mid-band to an oscillating frequency of the second-stage local oscillator, and a third-stage local oscillator for executing a frequency subtraction operation to subtract a frequency of the resultant signal from an oscillating frequency of the third-stage local oscillator to generate another better mid-band. As a result, second and third harmonic differences between the second-stage and third-stage local oscillators do not fall in the ranges of the two mid-bands, and the problem of intermodulation interference can therefore be avoided.

To achieve the above and other objects, the present invention mainly includes receiving antennas for receiving vertical and horizontal polarized signals from a satellite, an RF amplifying system for amplifying and down-converting the received signals, mixers for separately subtracting frequencies of the vertical and horizontal signals from an oscillating frequency of a first-stage common local oscillator, mid-frequency amplifiers and low-pass filters for amplifying and filtering the signals output by the mixers to generate a mid-band, an intermodulation system including a mixer for adding a frequency of the horizontal signal output from the mid-frequency amplifier to an oscillating frequency of a second-stage local oscillator, a band-pass filter for filtering and isolating the signal output from the mixer, and another mixer for subtracting a frequency of the signal output from the band-pass filter from an oscillating frequency of a third-stage oscillator, a high-pass filter for filtering noises from the signal output from another mixer to generate a better and non-repeated optimal mid-band, so that second and third harmonic differences between the second-stage and third-stage local oscillators do not fall in the ranges of the two mid-bands to avoid intermodulation interference, and a multiplex adder for combining the two mid-bands for transmitting via a single cable.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
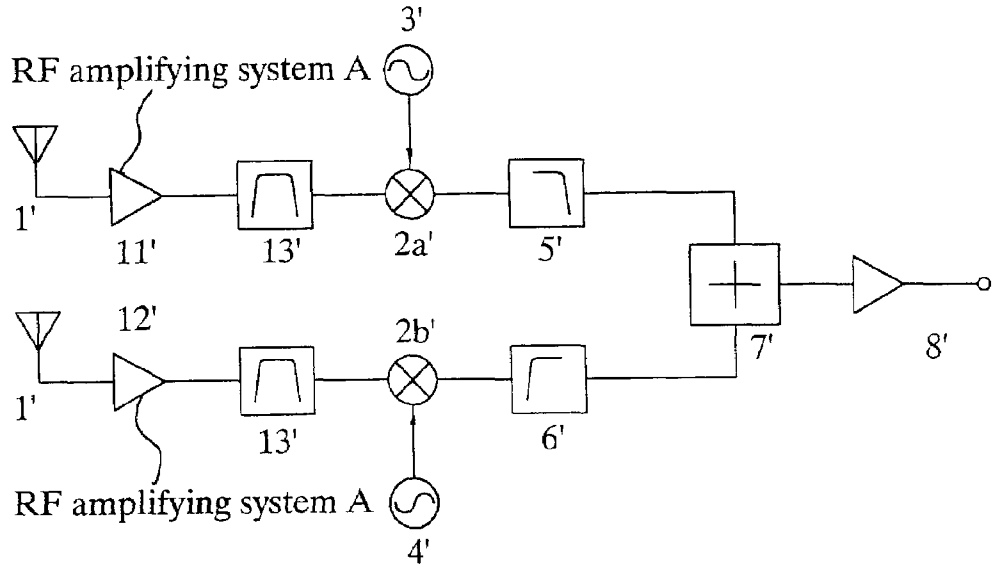
FIG. 1 shows the structure of a conventional satellite signal transmission apparatus.
Figure 2A:
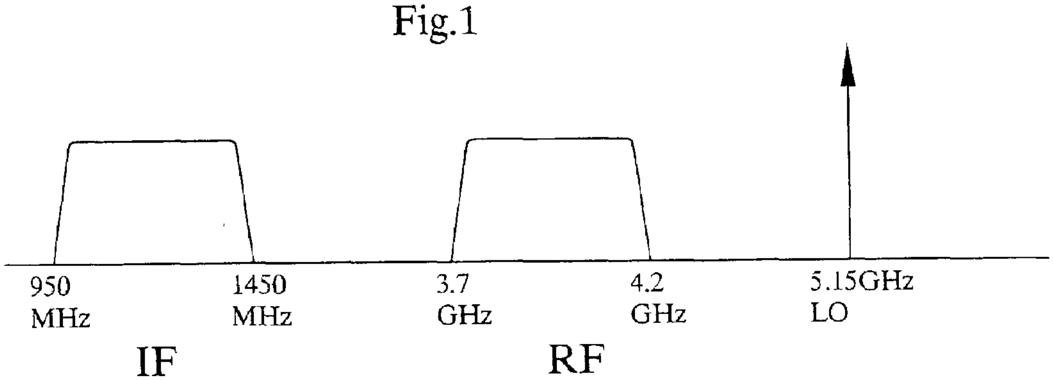
FIG. 2A shows a mid-band obtained from an example of the conventional satellite signal transmission apparatus of FIG. 1.
Figure 2B:
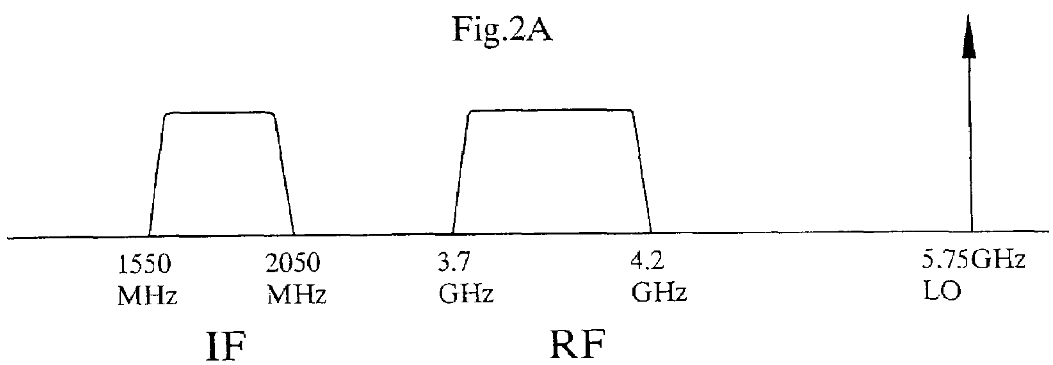
FIG. 2B shows another mid-band obtained from the same example of the conventional satellite signal transmission apparatus of FIG. 1.
Figure 2C:
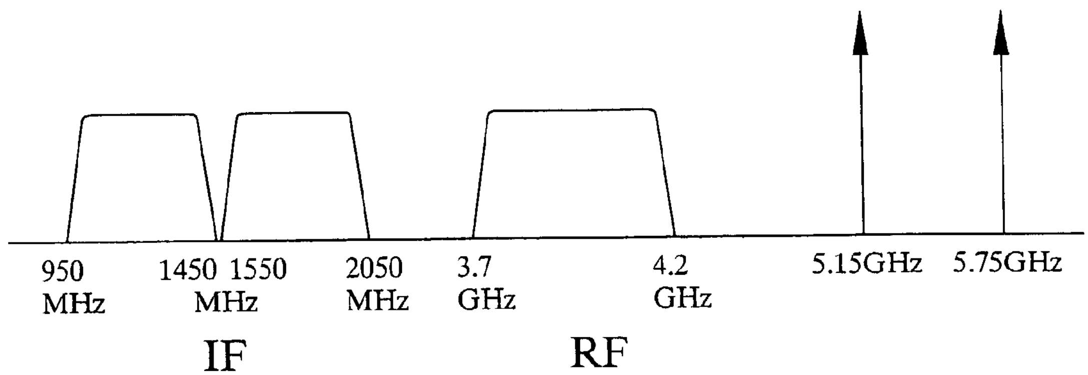
FIG. 2C shows the combined mid-band obtained by adding the two mid-bands of FIGS. 2A and 2B together.
Figure 2D:
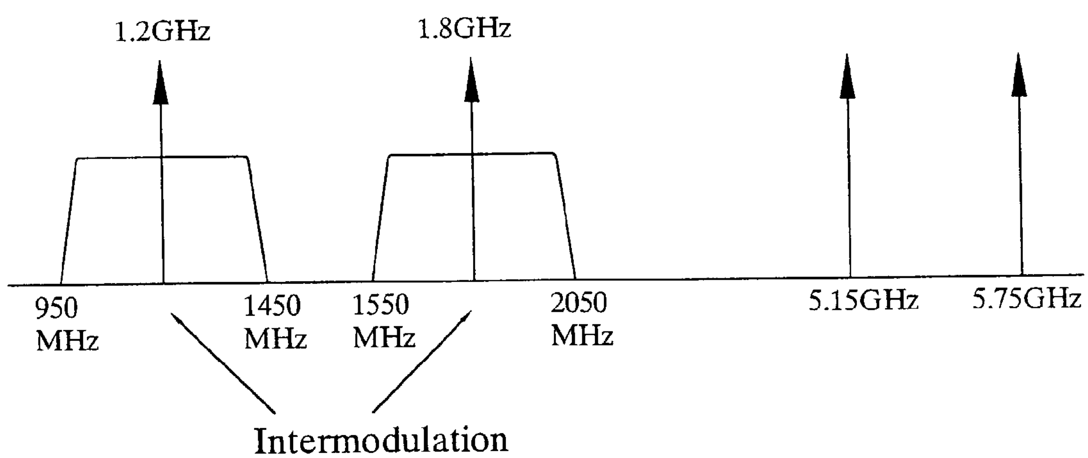
FIG. 2D shows the intermodulation in the conventional satellite signal transmission apparatus of FIG. 1.
Figure 3:
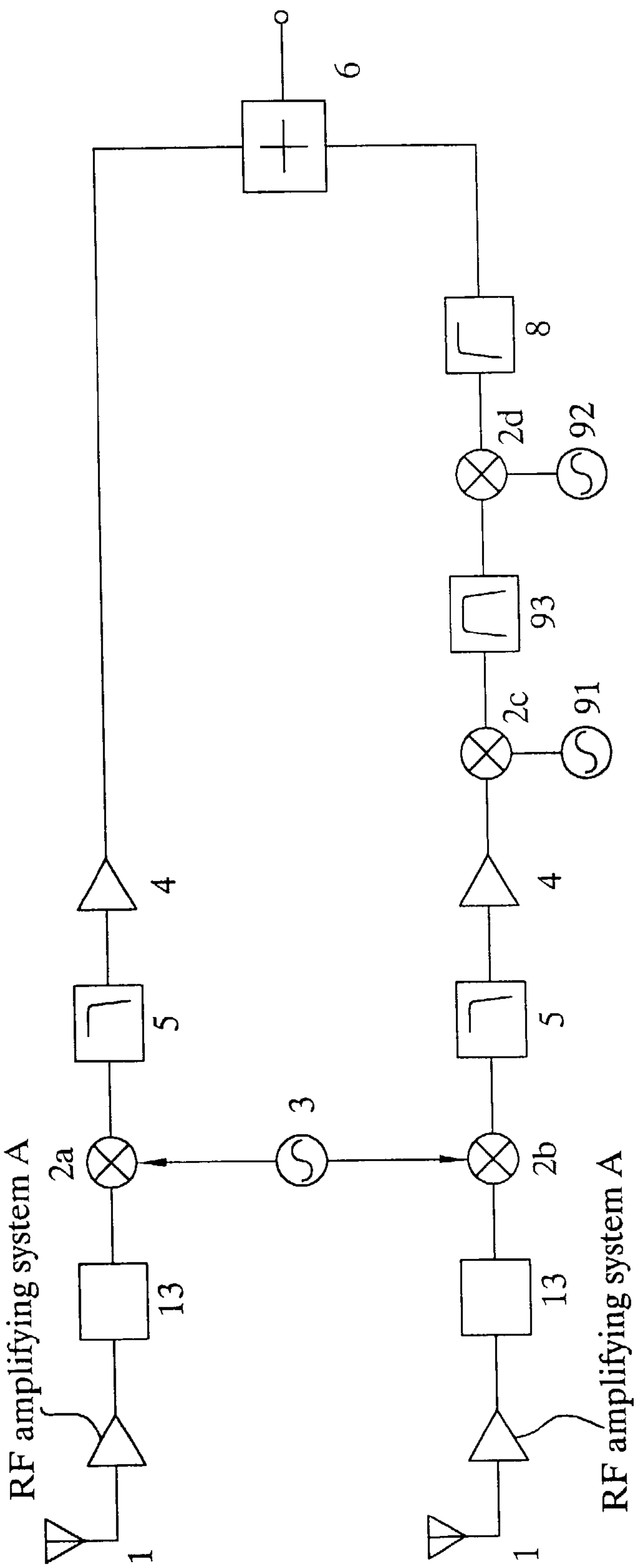
FIG. 3 shows the structure for reducing intermodulation interference in satellite signal transmission according to the present invention.

Please refer to FIG. 3 that shows a structure for reducing intermodulation interference in satellite signal transmission according to the present invention. As shown, the structure of the present invention mainly includes receiving antennas 1, an RF amplifying system A, mixers 2_a_ and 2_b_, two low-pass filters 5, a high-pass filter 8, a multiplex adder 6, a single cable 7, and an intermodulation system 9.

The receiving antennas 1 separately receive vertical and horizontal polarized signals transmitted from a satellite. The received signals are amplified and down-converted at the RF amplifying system A, that is formed from amplifiers 11, 12, and then sent to two band-pass filters 13 for filtering, in order to generate two signals with fixed bandwidth. The filtered signals are then sent to the mixers 2_a_ and 2_b_.

The mixers 2_a_, 2_b_ for the vertical and the horizontal signal receive an oscillating frequency of a first-stage common local oscillator 3 and execute a frequency subtraction operation to separately subtract the frequencies of the above-mentioned two signals with fixed bandwidth from the oscillating frequency of the first-stage common local oscillator, so as to generate two mid-bands. The first-stage common local oscillator 3 is a structure that reduces elements and costs of the satellite signal transmission structure of the present invention. A mid-frequency signal of one of the two generated mid-bands is amplified at a first mid-frequency amplifier 4 and filtered at a first low-pass filter 5 to remove noises therefrom, so as to generate a better mid-band thereof. Amid-frequency signal of the other mid-band is sent to and amplified at a second mid-frequency amplifier 4 and filtered at a second low-pass filter 5 to remove noises therefrom, and the filtered signal is sent to the intermodulation system 9.

The intermodulation system 9 includes mixers 2_c_ and 2_d_, a second-stage local oscillator 91, a band-pass filter 93, and a third-stage local oscillator 92. The intermodulation system 9 is characterized in that it executes a frequency addition operation at the mixer 2_c_ to add the frequency of the mid-frequency signal sent to the system 9 to the oscillating frequency of the second-stage local oscillator 91, and the resultant signal is then filtered and isolated at the band-pass filter 93. And, a frequency subtraction operation is executed at the mixer 2_d_ to subtract a frequency the resultant signal from the oscillating frequency of the third-stage local oscillator 92 to generate another better mid-band, which is filtered at the high-pass filter 8 to remove noises therefrom. The filtered signal and the previously mentioned mid-band signal are then together sent to the multiplex adder 6 and then transmitted via the single cable 7.

Figure 4A:
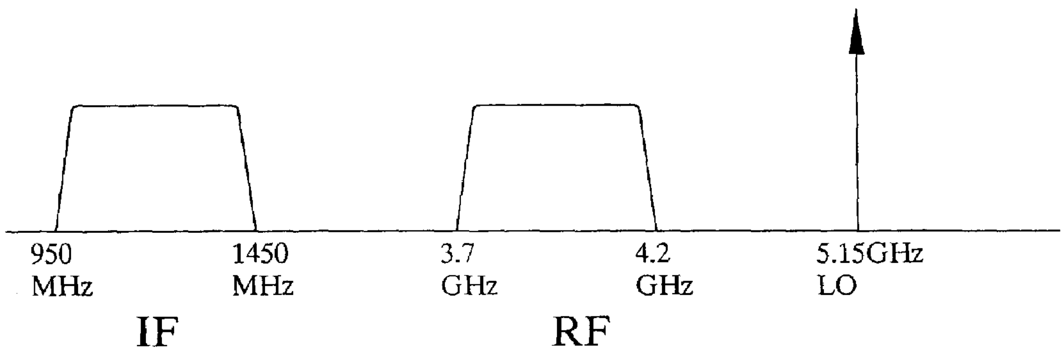
FIG. 4A shows a mid-band obtained from an example of the present invention.
Figure 4B:
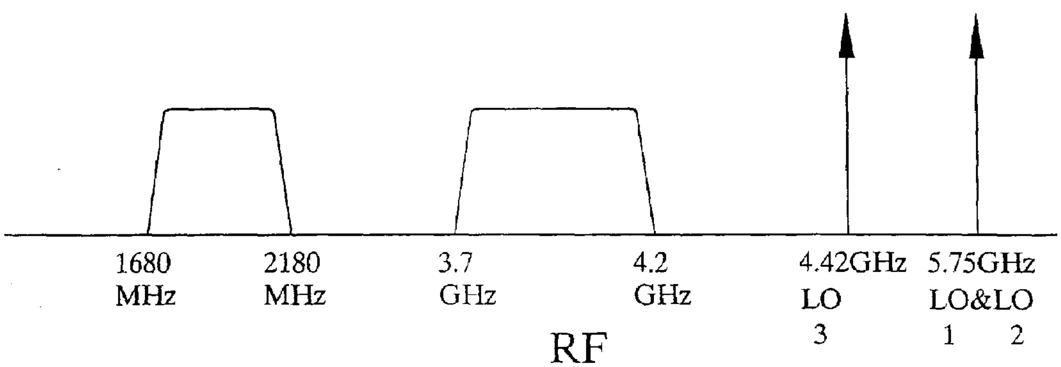
FIG. 4B shows another mid-band obtained from the same example of the present invention.
Figure 4C:
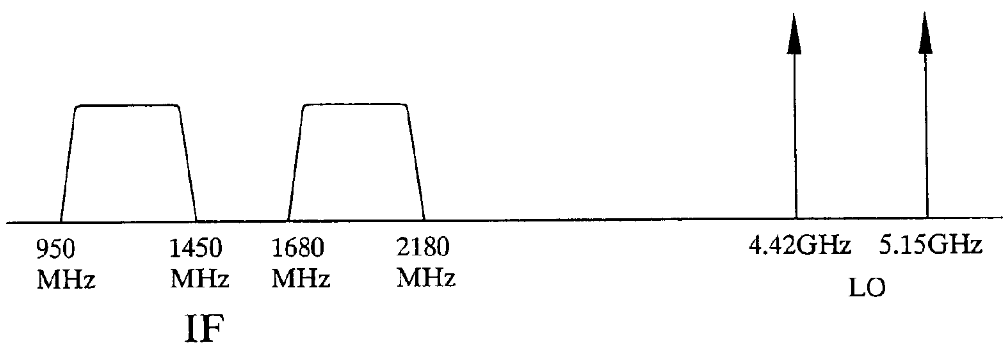
FIG. 4C shows a combined mid-band obtained by adding the two mid-bands of FIGS. 4A and 4B together.

To enable an even better understanding of many advantages of the present invention, an example of the present invention will now be described in more details with reference to the accompanying drawings. Please refer to FIG. 3. The vertical receiving antenna 1 receives a satellite vertical polarized signal having a frequency within the range from 3.7 to 4.2 GHz, and the horizontal receiving antenna 1 also receives a satellite horizontal polarized signal having a frequency within the range from 3.7 to 4.2 GHz. The vertical and the horizontal signal are separately amplified and down-converted at the amplifiers 11, 12 of the RF amplifying system A and sent to their respective band-pass filter 13 to generate two signals with fixed bandwidth. The generated signals are then separately sent to the mixers 2_a_ and 2_b_. The first-stage common local oscillator 3 has an oscillating frequency of 5.15 GHz. The mixer 2_a_ executes a frequency subtraction operation to obtain a maximum vertical frequency of 1450 Mhz (i.e., 5.15 GHz−3.7 GHz=1450 MHz) and a minimum vertical frequency of 950 MHz (i.e., 5.15 GHz−4.2 GHz= 950 MHz) for the vertical signal, which is amplified at the first mid-frequency amplifier 4 and filtered at the first low-pass filter 5 to remove noises therefrom, so as to generate a better mid-band, as shown in FIG. 4A. The mixer 2_b_ also obtains a horizontal frequency within the range from 950 to 1450 MHz for the horizontal signal, which is amplified at the second mid-frequency amplifier 4 and filtered at the second low-pass filter 5. The second-stage local oscillator 91 has an oscillating frequency of 5.15 HGz. The mixer 2_c_ executes a frequency addition operation to add the filtered horizontal frequency from the second amplifier 4 to the oscillating frequency of the second-stage local oscillator 91 to obtain a maximum horizontal frequency of 6600 MHz (i.e., 5.15 GHz+1.45 GHz=6600 MHz) and a minimum horizontal frequency of 6100 MHz (i.e., 5.15 GHz+0.95 GHz=6100 MHz) for the horizontal signal, which is filtered and isolated at the band-pass filter 93 and then sent to the mixer 2_d_, at where a frequency subtraction operation is executed to subtract the frequency of the filtered horizontal signal from the oscillating frequency of 4.42 GHz of the third-stage local oscillator 92 to obtain a maximum horizontal frequency of 2180 MHz (i.e., 6.6 GHz−4.42 GHz=2180 MHz) and a minimum horizontal frequency of 1568 MHz (i.e., 6.1 GHz−4.42 GHz=1568 MHz) for the horizontal signal, as shown in FIG. 4B. The horizontal signal obtained from the frequency subtraction operation is filtered at the high-pass filter 8 to remove noises therefrom to generate a better mid-band signal. The resultant vertical and horizontal mid-band signals are added at the multiplex adder 6 to generate a combined mid-band of the vertical and horizontal mid-band signals, as shown in FIG. 4C.

The second harmonic difference between the second-stage local oscillator 91 and the third-stage local oscillator 92 is 2×5150 MHz−2×4420 MHz=1460 MHz; and the third harmonic difference between the second-stage local oscillator 91 and the third-stage local oscillator 92 is 3×5150 MHz−3×4420 MHz=2190 MHz.

Figure 4D:
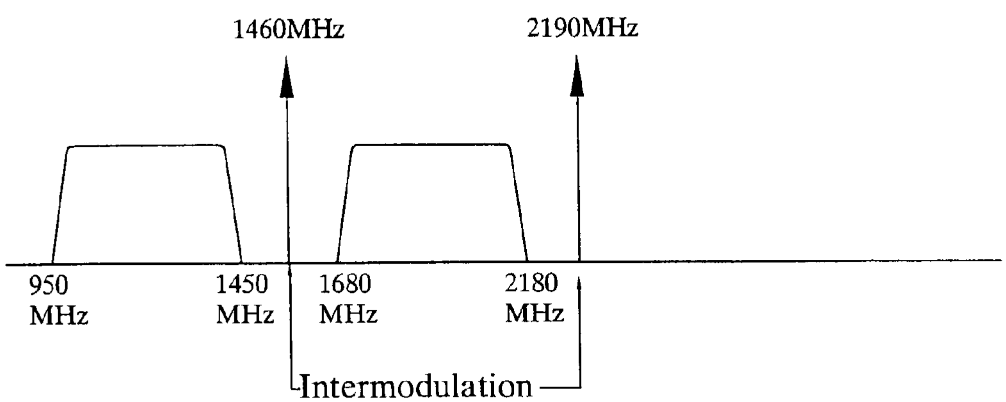
FIG. 4D shows the intermodulation in the structure of the present invention shown in FIG. 3.

The second and the third harmonic difference of 1460 MHz and 2190 MHz do not fall in the band ranges from 950 to 1450 MHz and from 1680 to 2180 MHz, respectively, as shown in FIG. 4D, and, therefore, no intermodulation interference would occur.

The present invention has been described with a preferred embodiment thereof and it is understood that many changes and modifications in the described embodiment can be carried out without departing from the scope and the spirit of the invention as defined by the appended claims.

What is claimed is:

1. A structure for reducing intermodulation interference in satellite signal transmission, comprising:

vertical and horizontal receiving antennas for receiving vertical and horizontal polarized signals sent from a satellite;

an RF amplifying system for amplifying and down-converting said received vertical and horizontal signals;

a first and a second mixer for executing a frequency subtraction operation;

a first-stage common local oscillator, from an oscillating frequency of which frequencies of said vertical and horizontal signals output from said RF amplifying system are separately subtracted in the frequency subtraction operation separately executed at said first and said second mixer to generate a mid-band;

a first mid-frequency amplifier and a first low-pass filter for amplifying and filtering noises from the signal output from said first mixer;

a second mid-frequency amplifier and a second low-pass filter for amplifying and filtering noises from the signal output from said second mixer;

an intermodulation system, including:

a third mixer for receiving the signal output from said second mid-frequency amplifier and executing a frequency addition operation;

a second-stage local oscillator, to an oscillating frequency of which a frequency of said signal output from said second mid-frequency amplifier is added in said frequency addition operation at said third mixer;

a band-pass filter for filtering and isolating the signal output from said third mixer;

a fourth mixer for receiving the signal output from said band-pass filter and executing a frequency subtraction operation; and a third-stage local oscillator, from an oscillating frequency of which a frequency of said signal output from said band-pass filter is subtracted in said frequency subtraction operation at said fourth mixer to generate a better mid-band; and a high-pass filter for filtering noises from the signal output from said fourth mixer; and a multiplex adder for combining said two mid-bands separately generated at said first mid-frequency amplifier and said high-pass filter;

whereby second and third harmonic differences between the oscillating frequencies of said second-stage and said third-stage local oscillator do not fall in band ranges of said two mid-bands, and an intermodulation interference is avoided.

2. The structure for reducing intermodulation interference in satellite signal transmission as claimed in claim 1, wherein said first-stage common local oscillator has a fixed oscillating frequency.

3. The structure for reducing intermodulation interference in satellite signal transmission as claimed in claim 1, wherein said second-stage and said third-stage local oscillator have oscillating frequencies that are optimal frequencies obtained via automatic setting to avoid intermodulation interference.

* * * * *